United States Patent
Taylor et al.

(12)

(10) Patent No.: US 6,811,721 B1
(45) Date of Patent: Nov. 2, 2004

(54) COMPOSITION AND METHOD FOR REDUCTION OF PERSISTENT BIO-ACCUMULATIVE AND TOXIC POLLUTANTS IN CARBOCHLORINATION PROCESSES

(75) Inventors: Stephen W. Taylor, Chadds Ford, PA (US); James B. Dunson, Jr., Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/448,692

(22) Filed: May 30, 2003

(51) Int. Cl.[7] .............................. C09K 3/22; C01B 9/02
(52) U.S. Cl. ..................................... 252/88.1; 252/88.2
(58) Field of Search ................................ 252/88.1, 88.2

(56) References Cited

U.S. PATENT DOCUMENTS

| | | | |
|---|---|---|---|
| 3,896,556 A | | 7/1975 | Welter |
| 4,421,629 A | * | 12/1983 | York et al. .................. 208/410 |
| 4,793,270 A | | 12/1988 | Karasek et al. |
| 5,032,146 A | * | 7/1991 | Knudson et al. .............. 44/592 |
| 5,620,669 A | | 4/1997 | Plinke et al. |
| 5,843,390 A | | 12/1998 | Plinke et al. |
| 6,027,697 A | | 2/2000 | Kurihara et al. |

\* cited by examiner

*Primary Examiner*—Yogendra N. Gupta
*Assistant Examiner*—D. G. Hamlin

(57) ABSTRACT

The present invention provides a composition and a method for reducing the production of persistent bio-accumulative and toxic pollutants in solid carbonaceous reduction reactions in carbochlorination processes.

5 Claims, No Drawings

COMPOSITION AND METHOD FOR REDUCTION OF PERSISTENT BIO-ACCUMULATIVE AND TOXIC POLLUTANTS IN CARBOCHLORINATION PROCESSES

BACKGROUND OF THE INVENTION

For fugitive dust emissions control, petroleum coke calciners use a variety of petroleum-derived dust suppression agents. These agents are commonly selected from a broad range of distillation fractions from crude oil processing. Agents may be selected from vacuum tower bottoms to asphalt to lube oils to paraffin wax, and these agents may possibly be mixtures formed from various combinations of distillate cuts.

The choice of dust suppression agent on petroleum coke has not been a concern of carbochlorination manufacturers beyond, perhaps, the hydrogen content of the agent and the weight percent loading of agent on the coke. Hydrogen content of the agent impacts the amount of hydrochloric acid that must be separated and removed from the carbochlorination products, particularly in the case of metal chloride product(s). Selection of suitable agents for use in the field of carbochlorination, as in other manufacturing processes has primarily been based on low cost.

Petroleum coke calciners here-to-fore have had essentially two criteria for dust suppressants: 1) flash point and 2) viscosity. A relatively high flash point is important from a safety perspective because suppression agents are typically applied to hot petroleum coke as the coke exits the after-cooler downstream of the calciner. Viscosity is important because it is indicative of tackiness for dust capture and retention. The dust-control efficacy of petroleum-derived dust suppression agents is somewhat dependent on viscosity. Another desirable property is a low pour point to avoid the need for the heat tracing of vessels and piping that store and deliver the suppression agent to the petroleum coke.

The inventors of the present invention have discovered that the certain petroleum-derived dust suppression agent impact, at trace levels, the production of halogenated organic PBT's (persistent, bio-accumulative, and toxic pollutants) in carbochlorination processes, specifically titani-ferrous ore carbochlorination. The selection of dust suppression agents according to the present invention lowers the production of trace quantities of halogenated organic PBT's.

BRIEF SUMMARY OF THE INVENTION

The present invention provides a composition and a method for reducing the production of persistent bio-accumulative and toxic pollutants in solid carbonaceous reduction reactions in the carbochlorination processes.

The composition of the invention comprises composition for reducing production of persistent, bio-accumulative, and toxic haloginated pollutants in carbochlorination processes comprising a solid carbonaceous reductant and a predominately linear- and branched-chain saturated hydrocarbon having low color, a viscosity in the range of 500 to 800 SUS at 100 degrees F. and a flash point above 450 degrees F. wherein the concentration of the hydrocarbon on surface of the reductant is the minimum concentration of the hydrocarbon necessary to control fugitive dust emissions.

The method of the present invention comprises using the composition of the present invention in carbochlorination.

Examples of carbochorination processes are processes for the production of metals from their chlorides such as titanium, aluminum and zirconium chlorides for the production of the respective metals or the oxides. The reductant in these reactions is a source of solid carbon particles called herein a solid carbonaceous reductant. The most common solid carbonaceous reductant used in these reactions is petroleum coke although other cokes and carbon sources are suitable for use.

DETAILED DESCRIPTION OF THE INVENTION

Petroleum coke calciners typically apply petroleum-derived dust suppression agents onto their calcined cokes after the coke has exited an after-cooler where the coke has been cooled to approximately 300 degrees F. Typically, the coke enters a rotating drum or mixer, equipped with lifters, where the coke is thoroughly tumbled as dust suppression agent is sprayed onto its surfaces. Each coke calciner may have unique and proprietary spray nozzles and nozzle configurations depending on their specific equipment to apply the dust suppression agent uniformly to the coke surfaces. The dust suppression agent is typically stored in a supply tank, which is typically heated and insulated, and delivered to the rotating drum or mixer via a pump and piping system which has a valve and possible instrumentation devices for flow and process control.

Typical dust suppression agents employed in the industry are a variety of petroleum-derived hydrocarbons from petroleum distillers such as the bottoms product of vacuum towers or specific distillate cut(s) from a fractionation process. These cut(s) can be derived from naphthenic or paraffinic distillates containing various percentages of polar, polycyclic, and unsaturated hydrocarbons as well as saturated hydrocarbons. Two examples are sited in U.S. Pat. No. 3,896,556 that are predominantly composed of greater than 70% aromatics. Other commercially available dust suppression agents, such as water-based polymers and vegetable oils, are undesirable additives to a carbochlorination process due to their hydrogen content.

PBT pollutants are chemicals that are toxic, persist in the environment, and bio-accumulate in food chains and, thus, pose risks to human health and ecosystems, per the United States Environmental Protection Agency. The challenges remaining on PBT pollutants stem from the fact that they transfer rather easily among air, water, and land, and span boundaries of programs, geography, and generations. Examples of halogenated organic PBT's include, but are not limited to, hexachlorobenzene, pentachlorobenzene, octachlorostyrene, chlorinated biphenyls, and the seventeen toxic congeners of poly-chloro-dibenzo-dioxin and poly-chloro-dibenzo-furan as identified by the World Health Organization. The U.S. EPA requires all U.S. facilities to annually report their emissions of these specific chlorinated PBT's if the total emissions to air, water, and land exceed specific threshold reporting values. An example is hexachlorobenzene at 10 pounds per year per emitting facility.

The discussion above has focused on calcined petroleum coke as a primary source of the solid carbonaceous reductant. Other solid sources of carbon are also suitable as the solid carbonaceous reductant. For example, coke derived from a coal-gasification process or graphite, or even charcoal.

The inventors are not aware of any methods currently practiced to reduce the levels of PBT's that are produced in carbochlorination reactions or other industrial chlorinations.

However, there are methods to destroy PBT's after their production, as well as appropriate disposal methods for PBT's in an approved and secure landfill. An example of destroying PBT's is incineration, with specific enhancement claims made on that technology using catalysts (as an example, refer to U.S. Pat. No. 4,793,270). Another example of downstream processing for destruction of specific PBT's is the use of a catalytic filtration system as practiced by W. L. Gore (U.S. Pat. Nos. 5,620,669 and 5,843,390) and Mitsubishi (U.S. Pat. No. 6,027,697). Photolysis and biodegradation are also emerging-technologies for the downstream destruction of organic PBT's. Other downstream destruction technologies promoted by non-governmental organizations include gas-phase chemical reduction, electrochemical oxidation, molten metal pyrolysis, molten salt oxidation, solvated electron process, supercritical water oxidation, and plasma arc. None of these are readily available, commercial-scale processes and each process would be expensive to develop.

The present invention provides a surprisingly simple method to reduce the production of PBT's. The hydrocarbon oils of the present invention may be produced from the distillation of crude oil. Process to make the oils of the present invention include the distillation of crude oil followed by processing to make additional product cuts. For example, the residue from atmospheric distillation of crude oil is further distilled under vacuum conditions to produce a range of vacuum distillates. Solvent extraction and/or hydrofining are then used to increase the viscosity index, enhance the color and convert undesirable chemical structures such as unsaturated hydrocarbons and aromatics to less chemically reactive species. Finally, solvent dewaxing is used to reduce the wax content of base oils so as to prevent wax crystals forming within the normal working temperature range of the lubricant or oil. Another process route to the oils of the present invention is solvent deasphalting of the vacuum residue with liquid propane which produces higher viscosity grades of lubricating oil base stocks. Liquid propane may be used to precipitate the resins and the asphaltenes to produce a deasphalted residual oil. This deasphalted residual oil is then further treated by solvent extraction and/or hydrogenation to reduce the aromatics content.

Below are specific examples of petroleum-derived base oils used in the manufacture of the oils of the present invention. These feed stocks oils are listed along with their reference CAS number. They are themselves derived from various distillate cuts and additional processing and typically come from neutral and paraffinic based-oils composed of mostly saturated C15 to C50 hydrocarbons in linear- and branched-chain structures.

Lubricating oils (petroleum), C20–50, hydrotreated neutral oil-based, high-viscosity (CAS #72623-85-9) A complex combination of hydrocarbons obtained by treating light vacuum gas oil, heavy vacuum gas oil, and solvent deasphalted residual oil with hydrogen in the presence of a catalyst in a two-stage process with dewaxing being carried out between the two stages. It consists predominantly of hydrocarbons having carbon numbers predominantly in the range of C20 through C50. The finished oil contains a relatively large proportion of saturated hydrocarbons.

Lubricating oils (petroleum), C15–30, hydrotreated neutral oil-based (CAS #72623-86-0) A complex combination of hydrocarbons obtained by treating light vacuum gas oil and heavy vacuum gas oil with hydrogen in the presence of a catalyst in a two-stage process with dewaxing being carried out between the two stages. It consists predominantly of hydrocarbons having carbon numbers predominantly in the range of C15 through C30. The finished oil contains a relatively large proportion of saturated hydrocarbons.

Lubricating oils (petroleum), C20–50, hydrotreated neutral oil-based (CAS #72623-87-1) A complex combination of hydrocarbons obtained by treating light vacuum gas oil, heavy vacuum gas oil and solvent deasphalted residual oil with hydrogen in the presence of a catalyst in a two-stage process with dewaxing being carried out between the two stages. It consists predominantly of hydrocarbons having carbon numbers predominantly in the range of C20 through C50. The finished oil contains a relatively large proportion of saturated hydrocarbons.

Distillates (petroleum) hydrotreated middle (CAS #64742-46-7) Distillates (petroleum), hydrotreated light paraffinic (CAS #64742-55-8) A complex combination of hydrocarbons obtained by treating a petroleum fraction with hydrogen in the presence of a catalyst. It consists of hydrocarbons having carbon numbers predominantly in the range of C15 through C30. The finished oil contains a relatively large proportion of saturated hydrocarbons.

Distillates (petroleum), hydrotreated heavy paraffinic (CAS #64742-54-7) A complex combination of hydrocarbons obtained by treating a petroleum fraction with hydrogen in the presence of a catalyst. It consists of hydrocarbons having carbon numbers predominantly in the range of C20 through C50. The finished oil contains a relatively large proportion of saturated hydrocarbons.

The hydrocarbon oils of the present invention are characterized as follows: petroleum-derived dust suppression agents that are essentially free of aromatic, asphaltenes, and polar compounds, and are essentially composed of linear- and branched-chain saturates (alkanes).

The composition specifications are based on a clay-gel absorption procedure, ASTM D 2007, which classifies oils into hydrocarbon types:

| Components | Composition |
| --- | --- |
| Asphaltenes | 0.0 wt. % |
| Polar Compounds | 0.5 wt. % (maximum) |
| Aromatics | 4.0 wt. % (maximum) |
| Saturates | 95.0 wt. % (minimum) |

A most preferred petroleum-derived dust suppression agent according to the present invention has a saturates composition of greater than 99.0 weight percent per the ASTM D 2007 procedure.

Color is another property that is an indicator of the purity of a petroleum-derived dust suppression agent. A water-white color is most preferred. However, a specification of no greater than 2.5 per ASTM D-6045 is acceptable.

Other properties of flash point, viscosity, and pour point are also specified to accommodate the requirements of petroleum coke calciners for dust suppression, safety, and ease-of-processing. These desired properties are listed below:

| Property | Specification |
| --- | --- |
| Viscosity, SUS @ 100 F° | 500 to 800 |
| Flash Point, ° F. | 450 (minimum) |
| Pour Point, ° F. | 15 (maximum) |

Preferred oils for the present invention include lubricating oil basestocks consisting of greater than 95% saturated hydrocarbons (alkanes) having carbon numbers predominantly in the range of C20 through C50. Examples of commercially available oils that are suitable for use in the present invention include, but are not limited to, the following oils:

TABLE

OILS SUITABLE FOR USE IN THE PRESENT INVENTION

|  | Conoco Hydroclear 580 | Conoco Paralube 600N | NOCO BL600HT |
|---|---|---|---|
| Clay-Gel, wt % |  |  |  |
| Asphaltenes | 0 | 0 | 0 |
| Polar Compounds | 0.1 | 0 | 0 |
| Aromatics | 3 | <0.1 | <0.3 |
| Saturates | 96.9 | 99.0 min | 99.7 |
| Property |  |  |  |
| Viscosity, SUS @ 100 F° | 610 | 625 | 527 |
| Flash Point, F° | 500 | 500 | 514 |
| Pour Point, F° | 10 | 10 | 10 |
| Color | 1.0 | 0.5 | <0.5 |

These oil have been tested in a batch, laboratory-scale, titani-ferrous ore carbochlorination unit and show significant reduction in trace levels of PBT's when compared to prior art de-dust oils.

The preferred weight % loading of dust suppression agent should be set as the minimum necessary for fugitive dust emissions control, but not greater than 0.2 wt. %. There is some indication that 0.12 wt. % loading is a possible minimum loading, and would be preferred. Fugitive dust emissions are air-borne particulate matter directly emitted to the atmosphere from sources such as factories, cars, and bulk handling operations, with an aerodynamic diameter of about 10 micrometers. Per the United States Environmental Protection Agency, these small particles are likely responsible for most adverse health effects of particulate because of their ability to reach the thoracic or lower regions of the respiratory tract.

From the batch, laboratory-scale, titani-ferrous ore carbochlorination unit, there appears to be upwards of a 10× reduction in halogenated organic PBT production between vacuum tower bottoms, approximately 27 wt. % saturates, versus one of the above oils, that are greater than 95 wt. % saturates, on petroleum coke. For a lube oil that is commercially applied to petroleum coke, which is approximately 66 wt. % saturates, there appears to be a 2× reduction in halogenated organic PBT production versus one of the above oils, that are greater than 95 wt. % saturates, on petroleum coke. The loading of petroleum-derived dust suppression agent on the petroleum cokes in these laboratory experiments was approximately 0.2 wt. %.

Plant testing of petroleum cokes with and without vacuum tower bottoms as the applied dust suppression agent also showed a significant reduction in halogenated organic PBT production, as much as a 40% reduction. In practical terms the level of PBT reduction that may be realized for a commercial-scale, industrial carbochlorination process is 5 to 50%.

What is claimed is:

1. A composition for reducing production of persistent, bio-accumulative, toxic pollutants in carbochlorination processes comprising a solid carbonaceous reductant and a predominately linear- and branched-chain saturated hydrocarbon having a viscosity in the range of 500 to 800 SUS at 100 degrees F. and a flash point above 450 degrees F. wherein the concentration of the hydrocarbon on surface of the reductant is the minimum concentration of the hydrocarbon necessary to control fugitive dust emissions.

2. The composition of claim 1 wherein the hydrocarbon has a color no greater than 2.5 as measured by ASTM D 6045.

3. The composition of claim 1 wherein the solid carbonaceous reductant is selected from the group consisting of calcined petroleum coke, coke derived from a coal-gasification process, graphite, or even charcoal.

4. The composition of claim 1 wherein the hydrocarbon is selected from lubricating oil basestocks consisting of greater than 95% saturated hydrocarbons having carbon numbers predominantly in the range of C20 through C50.

5. A method of reducing production of persistent, bio-accumulative and toxic pollutants in carbochlorination processes comprising using as the carbonaceous reductant the composition of claim 1.

* * * * *